United States Patent [19]

Reczek

[11] Patent Number: 4,598,030
[45] Date of Patent: Jul. 1, 1986

[54] PHOTOGRAPHIC PRODUCTS EMPLOYING NOVEL NONDIFFUSIBLE METAL COMPLEXES OF AZO DYES

[75] Inventor: James A. Reczek, Rochester, N.Y.

[73] Assignee: Eastman Kodak Company, Rochester, N.Y.

[21] Appl. No.: 761,932

[22] Filed: Aug. 2, 1985

Related U.S. Application Data

[62] Division of Ser. No. 688,203, Jan. 2, 1985, Pat. No. 4,562,139.

[51] Int. Cl.[4] .......................... G03C 1/40; C09B 45/00
[52] U.S. Cl. ..................................... 430/17; 430/518; 430/519; 534/662; 534/702; 534/707; 534/710; 534/713; 534/720
[58] Field of Search ................. 430/17, 519, 518, 223, 430/222, 225, 562; 534/662, 702, 707, 710, 720, 713

[56] References Cited

U.S. PATENT DOCUMENTS

| | | | |
|---|---|---|---|
| 4,148,643 | 4/1979 | Chapman et al. | 430/223 |
| 4,346,161 | 8/1982 | Krutak et al. | 430/223 |
| 4,358,527 | 11/1982 | Bailey et al. | 430/223 |
| 4,407,931 | 10/1983 | Evans | 430/223 |

OTHER PUBLICATIONS

"Exchange Studies of Certain Chelate Compounds of the Transitional Metals, Part VIII, 2,2',2"-Terpyridine Complexes", R. Hogy and R. G. Wilkins, *J. Chem. Soc.*, 341 (1962).

"The Kinetics of Replacement Reactions of Complexes of the Transition Metals with 2,2',2"-Terpyridine", R. H. Holyer, C. D. Hubbard, S. F. A. Kettle and R. G. Wilkins, *Inorg. Chem.*, 622 (1966).

"Effect of Stacking Interactions in Co-Ordination Kinetics", G. R. Cayley and D. W. Margerum, *J. Chem. Soc. Chem. Comm.*, 1002 (1974).

"Enhanced Stability of Ternary Complexes in Solution Through the Participation of Heteroaromatic N Bases, Comparison of the Coordination Tendency of Pyridine, Imidazole, Ammonia, Acetate, and Hydrogen Phosphate Toward Metal Ion Nitrilotriacetate Complexes", D. Banerjea, T. A. Kaden, and H. Sigel, *Inorg. Chem.*, 20, 2586 (1981).

*Primary Examiner*—Richard L. Schilling
*Attorney, Agent, or Firm*—Harold E. Cole

[57] ABSTRACT

Photographic elements, diffusion transfer assemblages and coordination complexes are described which employ a novel nondiffusible compound capable of releasing at least one diffusible dye moiety having the formula:

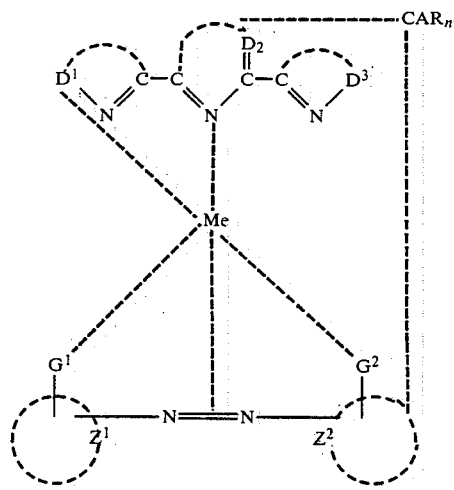

wherein:

(a) $D^1$, $D^2$ and $D^3$ each independently represents the atoms necessary to complete an aromatic heterocyclic nucleus having at least one ring of 5 to 7 atoms;

(b) $Z^1$ and $Z^2$ each independently represents the atoms necessary to complete an aromatic carbocyclic or heterocyclic nucleus having at least one ring of 5 to 7 atoms or a ketomethine group;

(c) $G^1$ and $G^2$ each independently represents a metal chelating group;

(d) Me is a polyvalent, hexacoordinate metal ion, (e) CAR represents a ballasted carrier moiety capable of releasing the diffusible dye moiety as a function of development of the silver halide emulsion layer under alkaline conditions; and (f) n is 1, 2 or 3.

17 Claims, No Drawings

PHOTOGRAPHIC PRODUCTS EMPLOYING NOVEL NONDIFFUSIBLE METAL COMPLEXES OF AZO DYES

This is a division of application Ser. No. 688,203, filed Jan. 2, 1985, now U.S. Pat. No. 4,562,139.

This invention relates to photography and more particularly to color diffusion transfer photography employing certain nondiffusible, dye-releasing compounds which, as a function of development of a silver halide emulsion layer, release a diffusible dye moiety. The dye-releasing compound comprises a metal complex of an azo dye and a nitrogen-coordinating tridentate ligand.

Various formats for color, integral transfer elements are described in the prior art, such as U.S. Pat. Nos. 3,415,644; 3,415,645; 3,415,646; 3,647,437; 3,635,707; 3,756,815, and Canadian Pat. Nos. 928,559 and 674,082. In these formats, the image-receiving layer containing the photographic image for viewing remains permanently attached and integral with the image generating and ancillary layers present in the structure when a transparent support is employed on the viewing side of the assemblage. The image is formed by dyes, produced in the image generating units, diffusing through the layers of the structure to the dye image-receiving layer. After exposure of the assemblage, an alkaline processing composition permeates the various layers to initiate development of the exposed photosensitive silver halide emulsion layers. The emulsion layers are developed in proportion to the extent of the respective exposures, and the image dyes which are formed or released in the respective image generating layers begin to diffuse throughout the structure. At least a portion of the imagewise distribution of diffusible dyes diffuses to the dye image-receiving layer to form an image of the original subject.

Complexes of terpyridine and various metals are described in the literature as follows: "Exchange Studies of Certain Chelate Compounds of the Transitional Metals. Part VIII. 2,2',2"-Terpyridine Complexes", R. Hogy and R. G. Wilkins, *J. Chem. Soc.*, 341 (1962); "The Kinetics of Replacement Reactions of Complexes of the Transition Metals with 2,2',2"-Terpyridine", R. H. Holyer, C. D. Hubbard, S. F. A. Kettle and R. G. Wilkins, *Inorg. Chem.*, 622 (1966); "Effect of Stacking Interactions in Co-ordination Kinetics", G. R. Cayley and D. W. Margerum, *J. Chem. Soc. Chem. Comm.*, 1002 (1974); and "Enhanced Stability of Ternary Complexes in Solution through the Participation of Heteroaromatic N Bases. Comparison of the Coordination Tendency of Pyridine, Imidazole, Ammonia, Acetate, and Hydrogen Phosphate toward Metal Ion Nitrilotriacetate Complexes", D. Banerjea, T. A. Kaden, and H. Sigel, *Inorg. Chem.*, 20, 2586 (1981). These references, however, do not disclose any use in photography.

U.S. Pat. No. 4,358,527 relates to 2:1 complexes of certain azo dyes:metal which are useful in color image transfer photography. Those complexes are advantageous in not having to provide metal ions in the mordant layers, which might increase $D_{min}$ and also tend to wander throughout the photographic element. These dye:metal complexes are larger in size, however, and consequently less diffusible than the corresponding unmetallized dye:ligand.

The dye:metal complexes which are most stable at high pH are generally the 2:1 dye:metal complexes. There are many metallizable azo dyes, however, that have other attractive properties that do not form stable 2:1 dye:metal complexes. These dyes form 1:1 complexes with monodentate ligands such as water, ammonia, acetate, pyridine or chloride to satisfy the other coordination sites. See, for example, column 20 of U.S. Pat. No. 4,148,643. It is theorized that these monodentate ligands are easily displaced by nucleophilic groups in the gelatin matrix. This causes part of the complex to be hung up in the gelatin matrix and slows down diffusion to the mordant.

It would be desirable to provide improved dye-releasing compounds comprising a ligand that would form a stable complex with azo dyes and metals which would not get hung up in a gelatin matrix and which would have improved diffusibility. It would also be desirable to provide complexes so that the full potential of a variety of azo dyes in their metallized form could be realized.

Accordingly, a photographic element of the invention comprises a support having thereon at least one photosensitive silver halide emulsion layer having associated therewith a dye image-providing material comprising a nondiffusible compound capable of releasing at least one diffusible dye moiety having the formula:

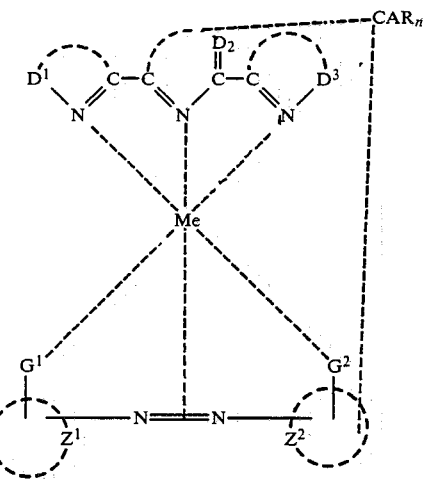

wherein:
(a) $D^1$, $D^2$ and $D^3$ each independently represents the atoms necessary to complete an aromatic heterocyclic nucleus having at least one ring of 5 to 7 atoms;
(b) $Z^1$ and $Z^2$ each independently represents the atoms necessary to complete an aromatic carbocyclic or heterocyclic nucleus having at least one ring of 5 to 7 atoms or a ketomethine group;
(c) $G^1$ and $G^2$ each independently represents a metal chelating group;
(d) Me is a polyvalent, hexacoordinate metal ion,
(e) CAR represents a ballasted carrier moiety capable of releasing the diffusible dye moiety as a function of development of the silver halide emulsion layer under alkaline conditions; and
(f) n is 1, 2 or 3.

In the above formula, $D^1$, $D^2$ and $D^3$ could each represent, for example, the atoms necessary to complete a pyridine ring, a pyrimidine ring, a thiazole ring, an oxazole ring, a selenazole ring, a 2-quinoline ring, an indolenine ring, an imidazole ring, a pyrazole ring or a benzimidazole ring. In a preferred embodiment, $D^1$, $D^2$ and $D^3$ each independently represents the atoms necessary to complete a pyridine or substituted pyridine ring.

$Z^1$ and $Z^2$ in the above formula could each represent, for example, the atoms necessary to complete a heterocyclic nucleus as mentioned above for $D^1$, $D^2$ and $D^3$, as well as a ketomethine group, a benzene ring, a naphthalene ring, etc. In a preferred embodiment, $Z^1$ and $Z^2$ each independently represents the atoms necessary to complete a substituted or unsubstituted pyridine ring, benzene ring, naphthalene ring or a ketomethine group.

In the above formula, $G^1$ and $G^2$ may represent any metal chelating group as long as it performs the desired function of coordinating with the metal. The metal chelating group can also be a part of $Z^1$ or $Z^2$ if desired. The above metal chelate can be formed by the loss of a proton from a conjugate acid, thereby forming a conjugate base, or by sharing a pair of electrons with the metal. There can be employed, for example, amino, alkylthio, hydroxy, carboxy, sulfonamido, or sulfamoyl. In a preferred embodiment, $G^1$ and $G^2$ independently represents hydroxy, carboxy, or a nitrogen atom which is part of $Z^1$ or $Z^2$.

In the above formula, Me can be any polyvalent, hexacoordinate metal ion as long as it performs the desired function of forming the metal:dye complex. There can be employed, for example, nickel(II), copper(II), zinc(II), platinum(II), cobalt(II) or cobalt(III). A preferred metal for coordination in the invention is nickel(II).

In a preferred embodiment of the invention, Me is nickel(II), n is 1, CAR is attached to the pyridine ring of $D^2$, and $Z^1$ and $Z^2$ each independently represents the atoms necessary to complete a substituted or unsubstituted pyridine ring, phenol ring, naphthol ring or ketomethine group.

Other substituents may also be present in the rings illustrated above, such as alkyl of 1 to 6 carbon atoms, acyl, aryl of 6 to 10 carbon atoms, aralkyl, alkylsulfonyl, amino, alkoxy, halogen such as chloro or bromo, morpholino, phenylsulfamoyl, solubilizing groups such as sulfonamido, sulfamoyl, carboxy, sulfo or hydrolyzable precursors thereof. Solubilizing groups are preferred in order to aid in diffusion and mordanting by providing an overall negative charge.

One or more counter ions of positive or negative charge may be present for charge neutrality to balance the charge on the metal ion depending upon the nature of (and any optional auxiliary groups contained in) the ligand and azo dye. Preferably the azo dye contains one or two groups which become negatively charged upon ionization, such as phenolic OH, to neutralize the charges on the metal ion.

The released dyes according to the invention have good diffusibility along with better hues and light stability than the same dye without the ternary ligand described above.

The dye moiety in the formula above consisting of the $Z^1$ and $Z^2$ nuclei, $G^1$ and $G^2$ groups, and the azo group are well known in the art as illustrated, for example, by Baigrie et al U.S. Pat. No. 4,142,891, Anderson et al U.S. Pat. No. 4,147,544, Chapman et al U.S. Pat. No. 4,195,994 and Baigrie et al U.S. Pat. No. 4,272,434, the disclosures of which are hereby incorporated by reference.

There is great latitude in selecting a CAR moiety which is attached to the dye-releasing compounds described above. Depending upon the nature of the ballasted carrier selected, various groups may be needed to attach or link the carrier moiety to the dye. Such linking groups are considered to be a part of the CAR moiety in the above definition. It should also be noted that, when the dye moiety is released from the compound, cleavage may take place in such a position that part or all of the linking group, if one is present, and even part of the ballasted moiety, may be transferred to the image-receiving layer, along with the dye moiety. In any event, the dye nucleus as shown above can be thought of as the minimum which is transferred.

CAR moieties useful in the invention are described in U.S. Pat. Nos. 3,227,550; 3,628,952; 3,227,552 and 3,844,785 (dye released by chromogenic coupling); U.S. Pat. Nos. 3,443,939 and 3,443,940 (dye released by intramolecular ring closure); U.S. Pat. Nos. 3,698,897 and 3,725,062 (dye released from hydroquinone derivatives); U.S. Pat. No. 3,728,113 (dye released from a hydroquinonylmethyl quaternary salt); U.S. Pat. Nos. 3,719,489 and 3,443,941 (silver ion induced dye release); British Patent Publication No. 2,017,950A (dye released by a dye bleach process); U.S. Pat. Nos. 4,053,312; 4,198,235; 4,179,231; 4,055,428 and 4,149,892 (dye released by oxidation and deamidation); and U.S. Pat. Nos. 3,245,789 and 3,980,497; Canadian Pat. No. 602,607; British Pat. No. 1,464,104; *Research Disclosure* 14447, April 1976; U.S. Pat. No. 4,139,379 of Chasman et al, U.S. Pat. No. 4,232,107 and European Patent Publication No. 12908 (dye released by miscellaneous mechanisms), the disclosures of which are hereby incorporated by reference.

In a further preferred embodiment of the invention, the ballasted carrier moiety or CAR as described above may be represented by the following formula:

(Ballast—Carrier—Link)— wherein:
(a) Ballast is an organic ballasting radical of such molecular size and configuration as to render said compound nondiffusible in said photographic element during development in an alkaline processing composition;
(b) Carrier is an oxidizable acyclic, carbocyclic or heterocyclic moiety (see *The Theory of the Photographic Process*, by C. E. K. Mees and T. H. James, Third Edition, 1966, pages 282 to 283), e.g., moieties containing atoms according to the following configuration:

a(—C=C)$_b$— wherein:
b is a positive integer of 1 to 2; and
a represents the radicals OH, SH, NH or hydrolyzable precursors thereof; and
(c) Link represents a group which, upon oxidation of said Carrier moiety, is capable of being hydrolytically cleaved to release the diffusible azo dye. For example, Link may be the following groups:

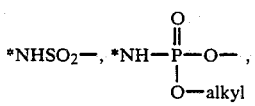

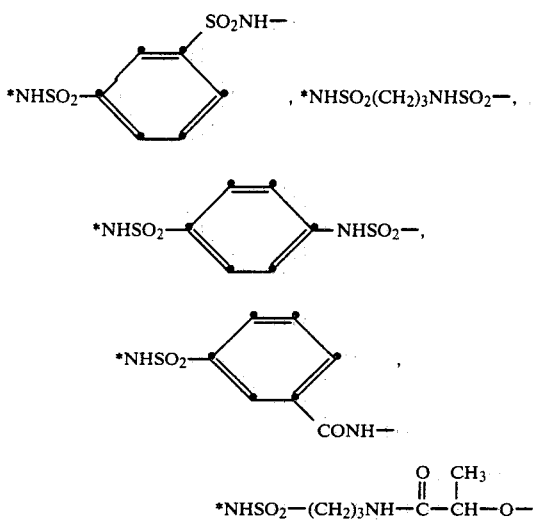

wherein * represents the position of attachment to Carrier.

The Ballast group in the above formula is not critical, as long as it confers nondiffusibility to the compound. Typical Ballast groups include long-chain alkyl radicals, as well as aromatic radicals of the benzene and naphthalene series linked to the compound. Useful Ballast groups generally have at least 8 carbon compounds, such as substituted or unsubstituted alkyl groups of 8 to 22 carbon atoms; a carbamoyl radical having 8 to 30 carbon atoms, such as —CONH(CH$_2$)$_4$—O—C$_6$H$_3$(C$_5$H$_{11}$)$_2$ or —CON(C$_{12}$H$_{25}$)$_2$; or a keto radical having 8 to 30 carbon atoms, such as —CO—C$_{17}$H$_{35}$ or —CO—C$_6$H$_4$(t—C$_{12}$H$_{25}$).

For specific examples of Ballast-Carrier moieties useful as the CAR moiety in this invention, reference is made to the November 1976 edition of *Research Disclosure*, pages 68 through 74, and the April 1977 edition of *Research Disclosure*, pages 32 through 39, the disclosures of which are hereby incorporated by reference.

In a highly preferred embodiment of the invention, the ballasted carrier moiety or CAR in the above formula is a group having the formula:

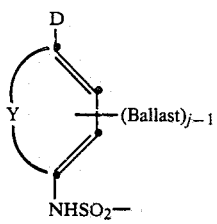

wherein:
(a) Ballast is an organic ballasting radical of such molecular size and configuration (e.g., simple organic groups or polymeric groups) as to render said compound nondiffusible in a photographic element during development in an alkaline processing composition;
(b) D is OR$^1$ or NHR$^2$ wherein R$^1$ is hydrogen or a hydrolyzable moiety, such as acetyl, mono-, di- or trichloroacetyl radicals, perfluoroacyl, pyruvyl, alkoxyacyl, nitrobenzoyl, cyanobenzoyl, sulfonyl or sulfinyl, and R$^2$ is hydrogen or a substituted or unsubstituted alkyl group of 1 to 22 carbon atoms, such as methyl, ethyl, hydroxyethyl, propyl, butyl, secondary butyl, tertbutyl, cyclopropyl, 4-chlorobutyl, cyclobutyl, 4-nitroamyl, hexyl, cyclohexyl, octyl, decyl, octadecyl, dodecyl, benzyl or phenethyl (when R$^2$ is an alkyl group of greater than 8 carbon atoms, it can serve as a partial or sole Ballast);
(c) Y represents at least the atoms necessary to complete a benzene nucleus, a naphthalene nucleus, or a 5 to 7 membered heterocyclic ring, such as pyrazolone or pyrimidine; and
(d) j is a positive integer of 1 to 2 and is 2 when D is OR$^1$ or when R$^2$ is hydrogen or an alkyl group of less than 8 carbon atoms.

Especially good results are obtained in the above formula when D is OH, j is 2, and Y is a naphthalene nucleus.

Examples of the CAR moiety in this highly preferred embodiment are disclosed in U.S. Pat. Nos. 4,076,529; 3,993,638 and 3,928,312, the disclosures of which are hereby incorporated by reference, and include the following:

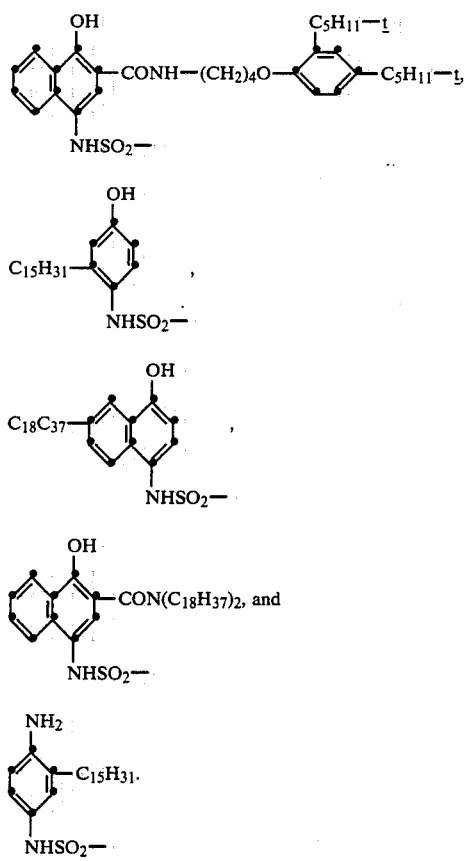

In another highly preferred embodiment of the invention, the ballasted carrier moiety or CAR in the above formulas is such that the diffusible azo dye is released as an inverse function of development of the silver halide emulsion layer under alkaline conditions. This is ordinarily referred to as positive-working dye-release chemistry. In one of these embodiments, the ballasted carrier moiety or CAR in the above formulas may be a group having the formula:

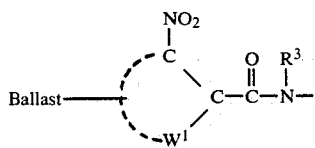

(I)

wherein:
 Ballast is an organic ballasting radical of such molecular size and configuration as to render said compound nondiffusible in a photographic element during development in an alkaline processing composition;
 $W^1$ represents at least the atoms necessary to complete a benzene nucleus (including various substituents thereon); and
 $R^3$ is an alkyl (including substituted alkyl) radical having 1 to about 4 carbon atoms.

Examples of the CAR moiety in this formula (I) include the following:

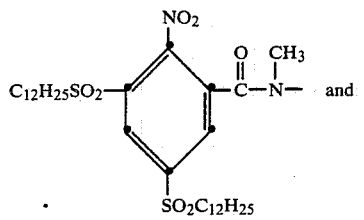

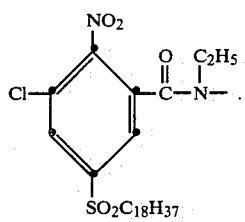

In a second embodiment of positive-working dye-release chemistry as referred to above, the ballasted carrier moiety or CAR in the above formulas may be a group having the formula:

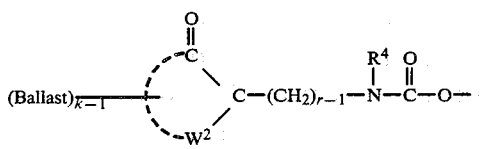

(II)

wherein:
 Ballast is an organic ballasting radical of such molecular size and configuration as to render said compound nondiffusible in a photographic element during development in an alkaline processing composition;
 $W^2$ represents at least the atoms necessary to complete a quinone nucleus (including various substituents thereon);
 r is a positive integer of 1 or 2;
 $R^4$ is an alkyl (including substituted alkyl) radical having 1 to about 40 carbon atoms or an aryl (including substituted aryl) radical having 6 to about 40 carbon atoms; and
 k is a positive integer of 1 to 2 and is 2 when $R^4$ is a radical of less than 8 carbon atoms.

Examples of the CAR moiety in this formula (II) include the following:

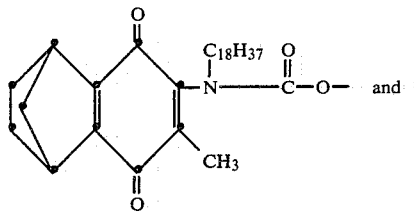

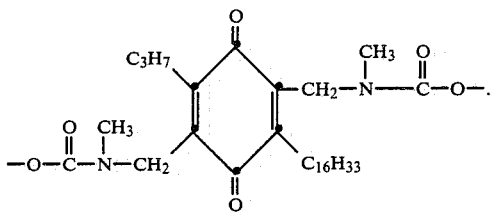

In using the compounds in formulas I and II above, they are employed in a photographic element similar to the other nondiffusible dye-releasers described previously. Upon reduction of the compound as a function of silver halide development under alkaline conditions, the metallizable azo dye is released. In this embodiment, conventional negative-working silver halide emulsions, as well as direct-positive emulsions, can be employed. For further details concerning these particular CAR moieties, including synthesis details, reference is made to U.S. Pat. No. 4,139,379 of Chasman et al, the disclosure of which is hereby incorporated by reference.

In a third embodiment of positive-working dye-release chemistry as referred to above, the ballasted carrier moiety or CAR in the above formulas may be a group having the formula:

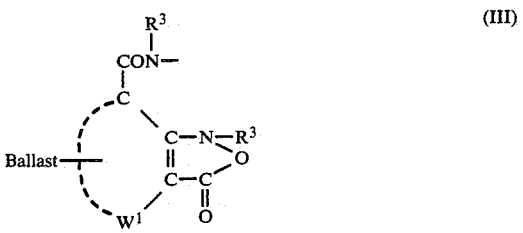

(III)

wherein:
 Ballast, $W^1$ and $R^3$ are as defined for formula (I) above.

Examples of the CAR moiety in this formula (III) include the following:

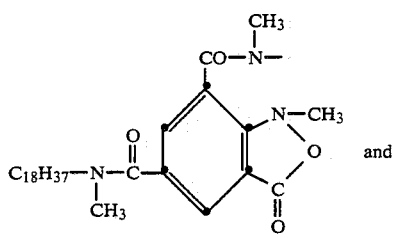

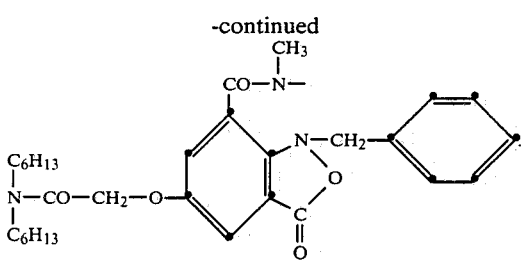

For further details concerning this particular CAR moiety, including synthesis details, reference is made to U.S. Pat. No. 4,199,354 of Hinshaw et al, the disclosure of which is hereby incorporated by reference.

In a fourth embodiment of positive-working dye-release chemistry as referred to above, the ballasted carrier moiety or CAR in the above formulas may be a group having the formula:

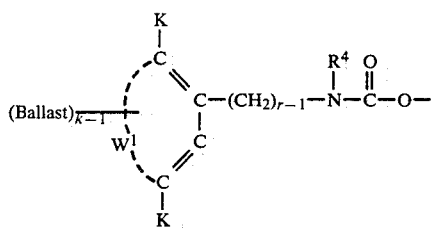

(IV)

wherein:

Ballast, r, $R^4$ and k are as defined for formula (II) above;

$W^1$ is as defined for formula (I) above; and

K is OH or a hydrolyzable precursor thereof.

Examples of the CAR moiety in this formula (IV) include the following:

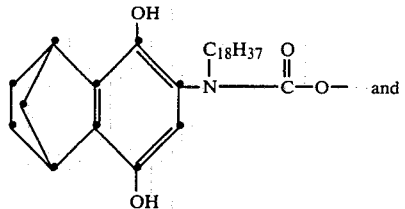

and

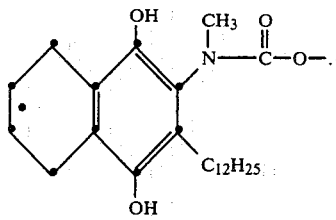

For further details concerning this particular CAR moiety, including synthesis details, reference is made to U.S. Pat. No. 3,980,479 of Fields et al, the disclosure of which is hereby incorporated by reference.

Representative compounds included within the scope of the invention include the following:

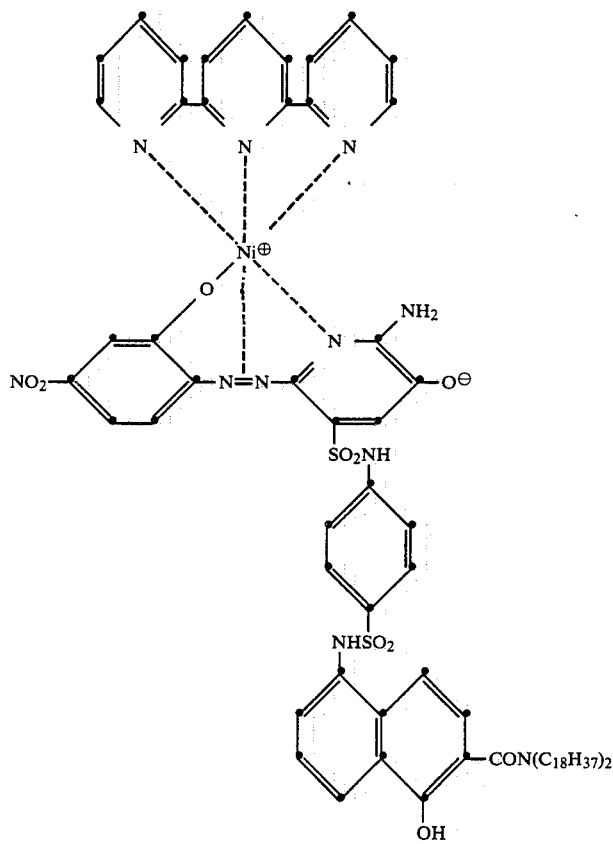

(1)

(2)
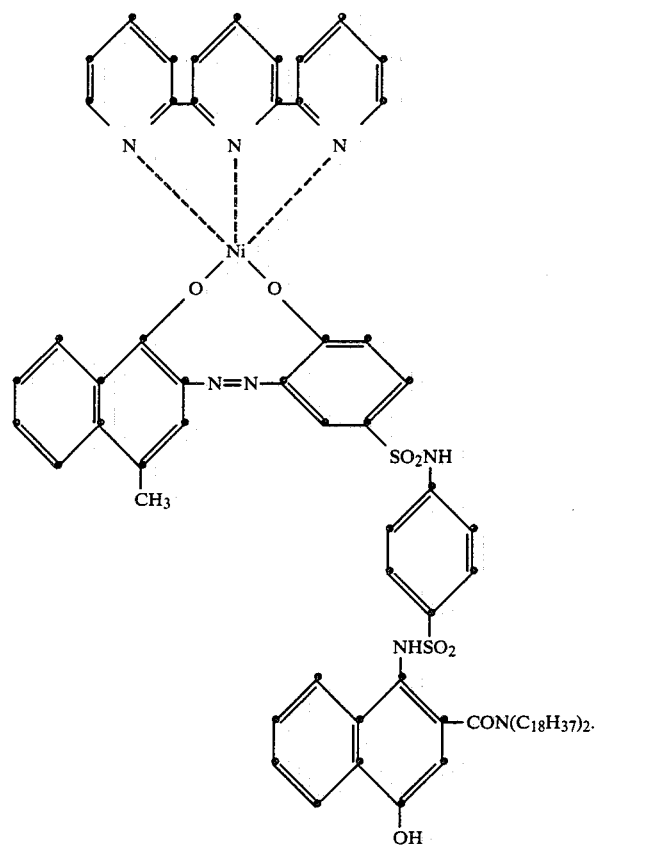
(3)
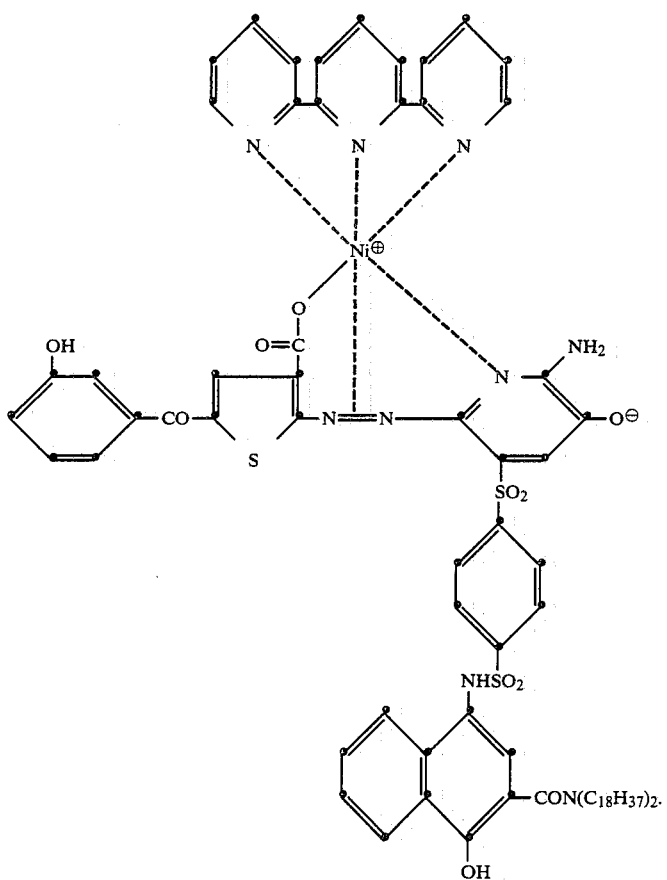

-continued
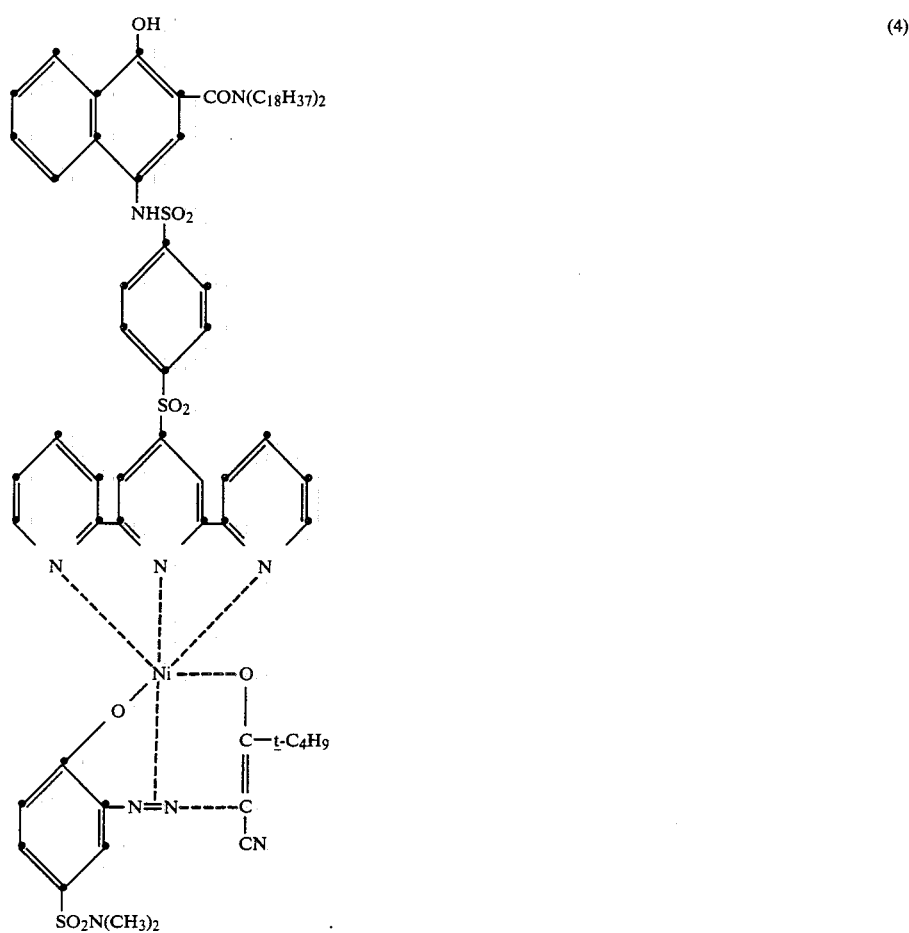
(4)

-continued
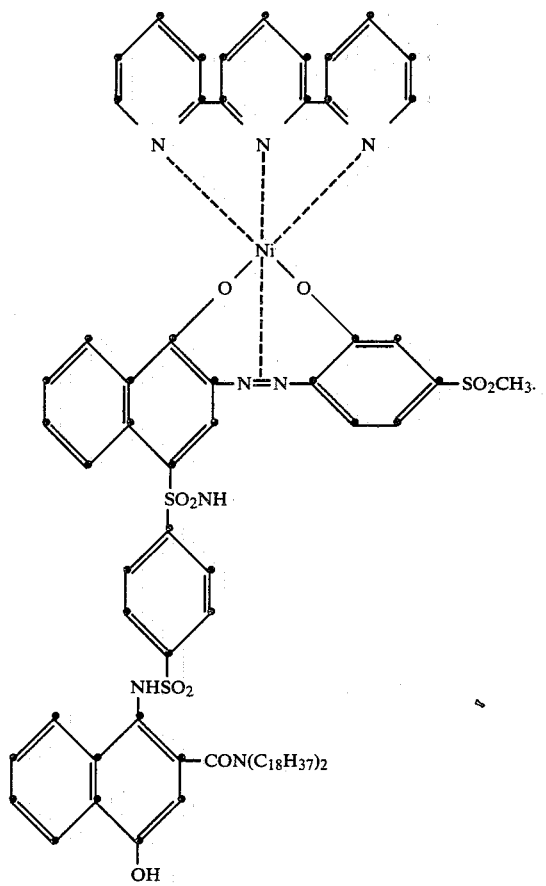
(5)

-continued
(6)
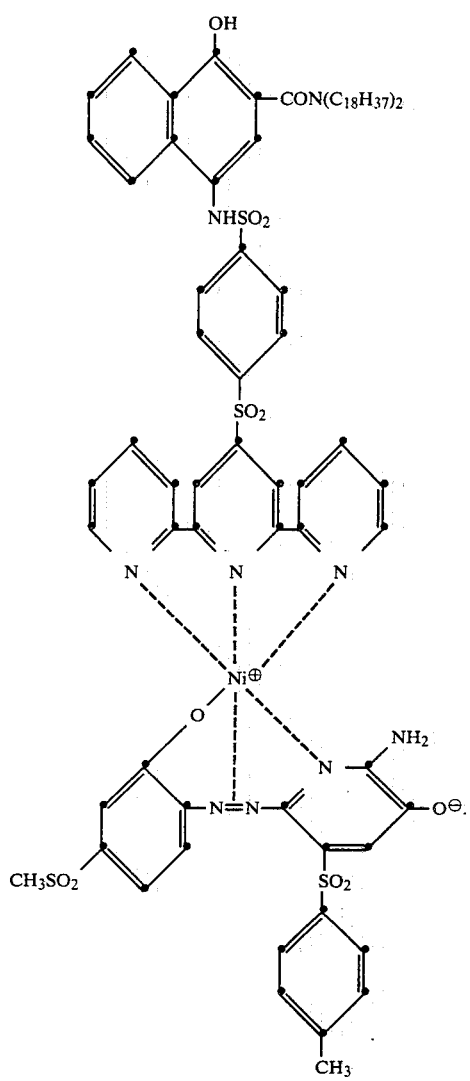
(7)
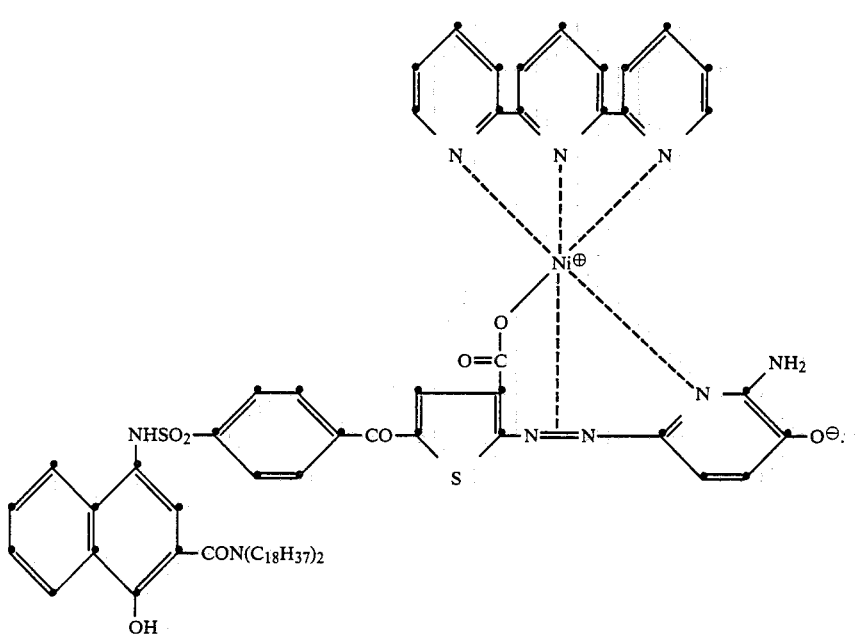

-continued
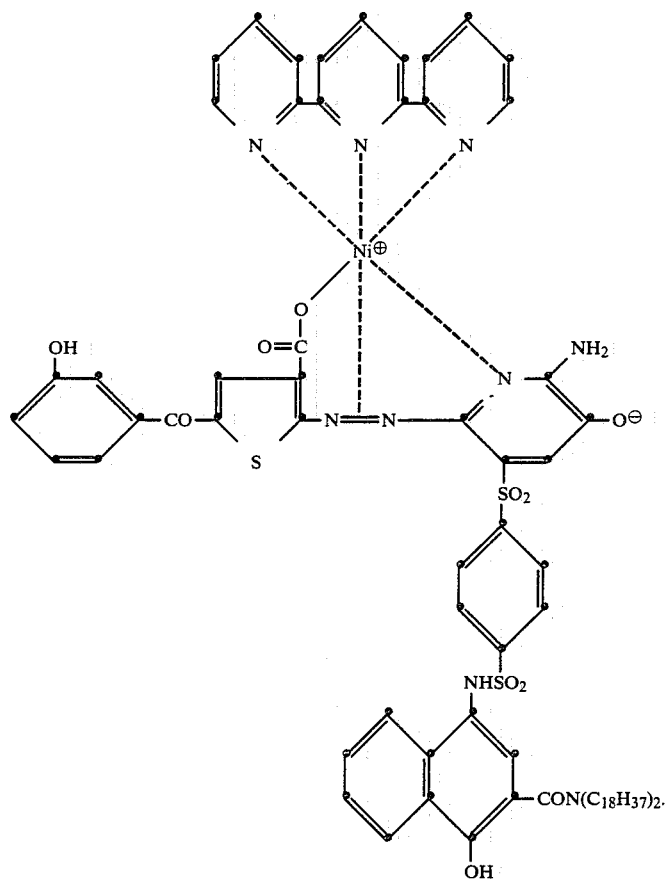
(8)

-continued
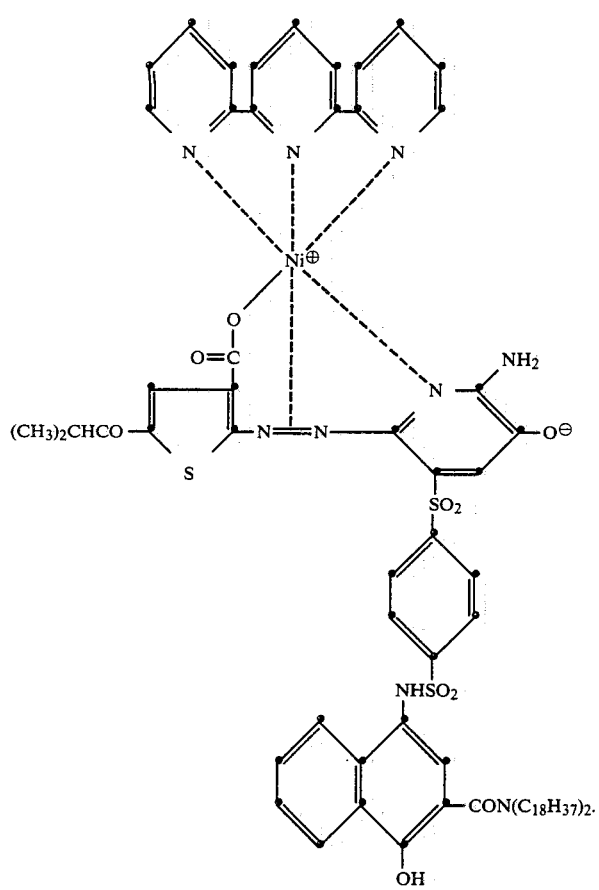
(9)

(10)
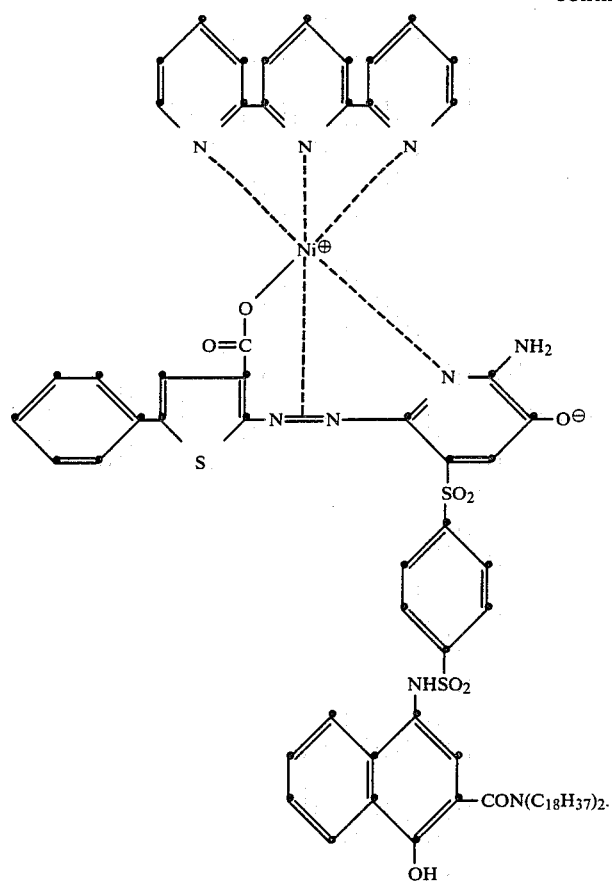
(11)
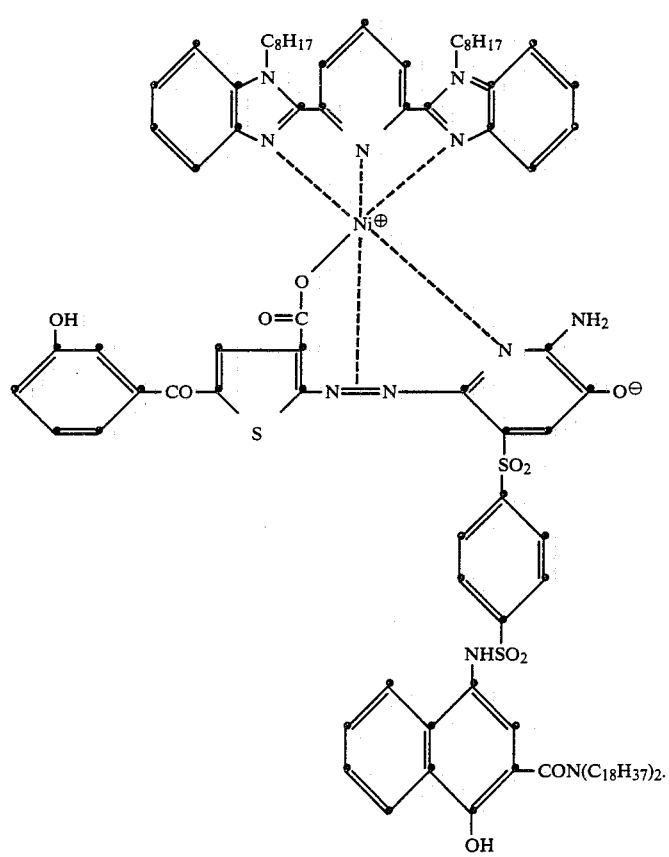

-continued
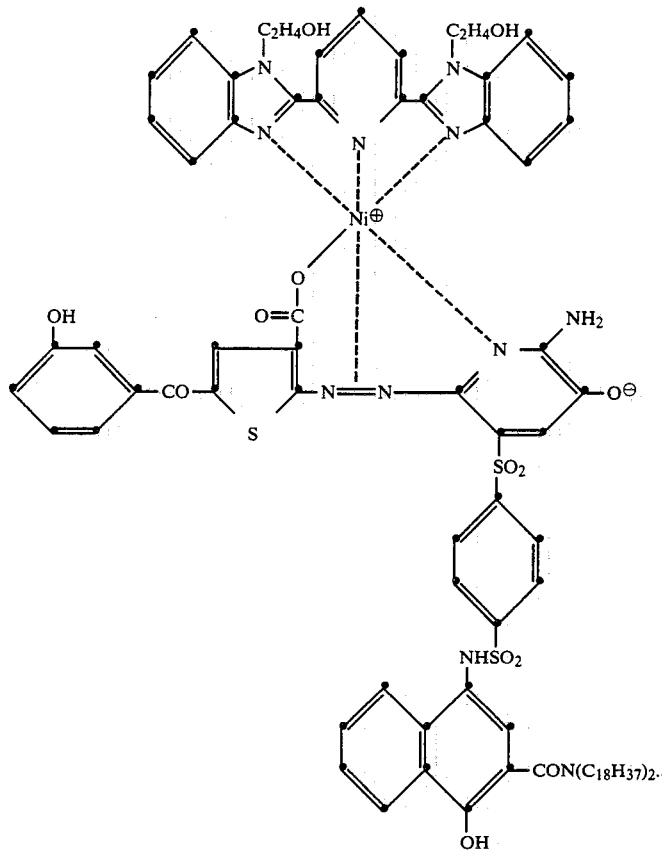
(12)

-continued
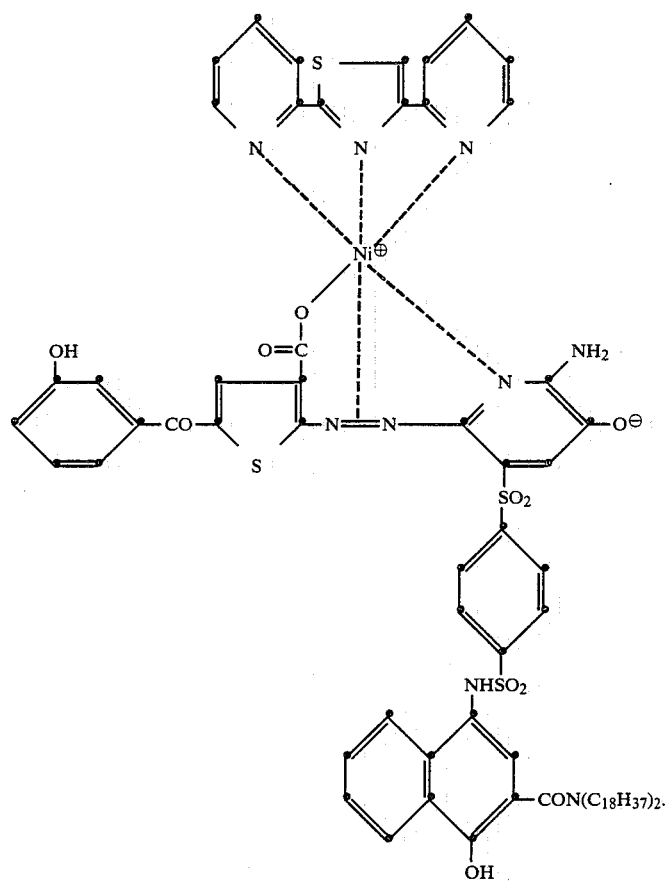
(13)

-continued
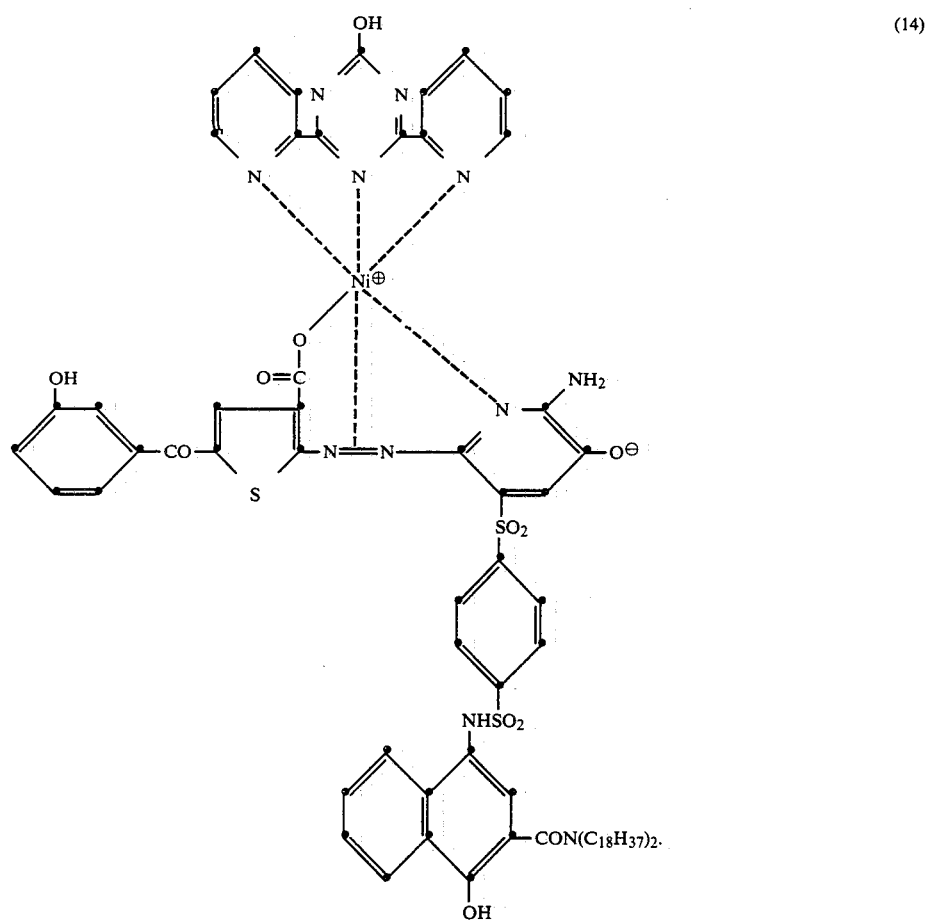
(14)

-continued
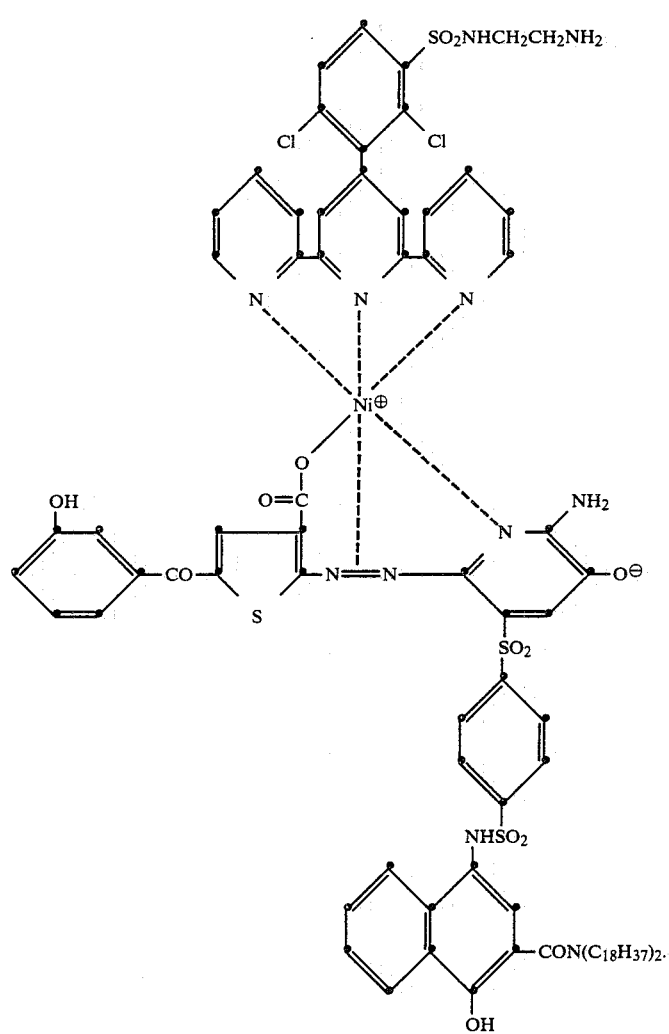
(15)

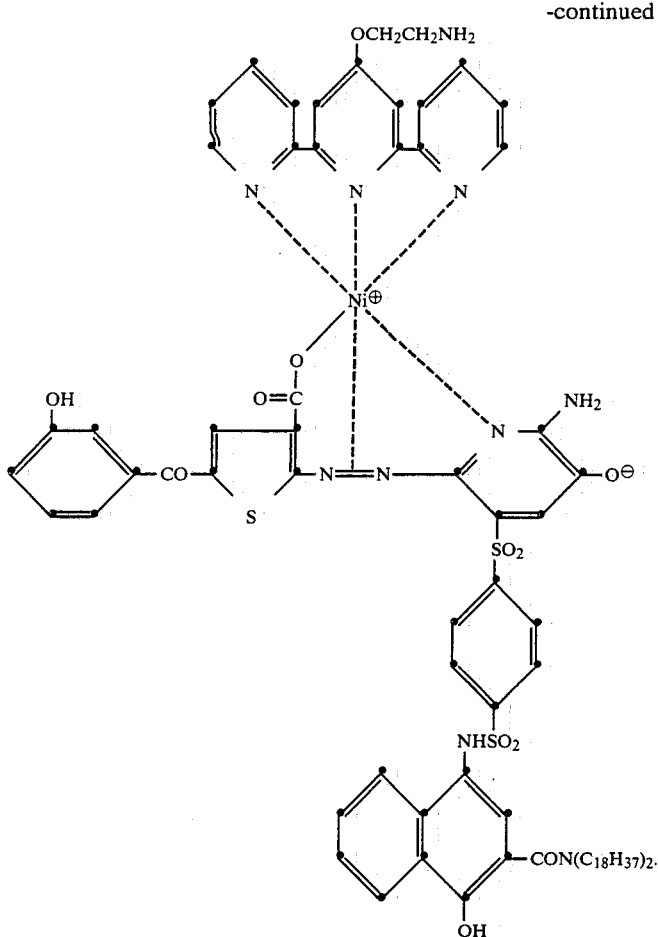

(16)

A coordination complex according to the invention comprises the formula listed above without the CAR moiety, i.e.,

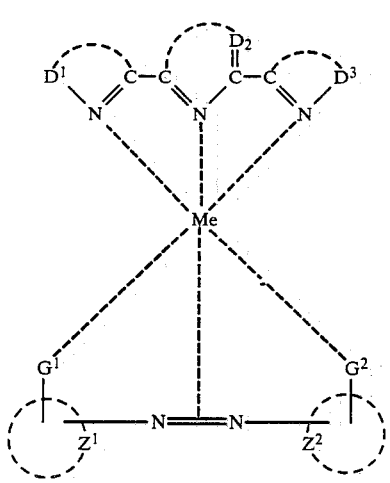

wherein $D^1$, $D^2$, $D^3$, Me, $G^1$, $G^2$, $Z^1$ and $Z^2$ are defined as above.

In another embodiment of the invention, a photographic element is provided comprising a support having thereon a photographic mordant having bound thereto a coordination complex having the formula:

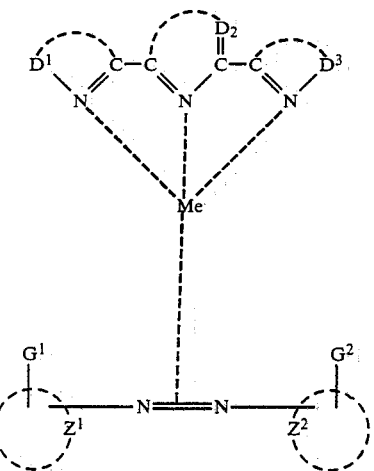

wherein $D^1$, $D^2$, $D^3$, Me, $G^1$, $G^2$, $Z^1$ and $Z^2$ are defined as above.

The nitrogen coordinating tridentate ligand is a unique feature of the metal-dye complexes of the invention. Other closely related ligand structures are not effective. For example, the following ligands were ineffective alone due to hydrolytic instability or because they wouldn't form a ternary complex:

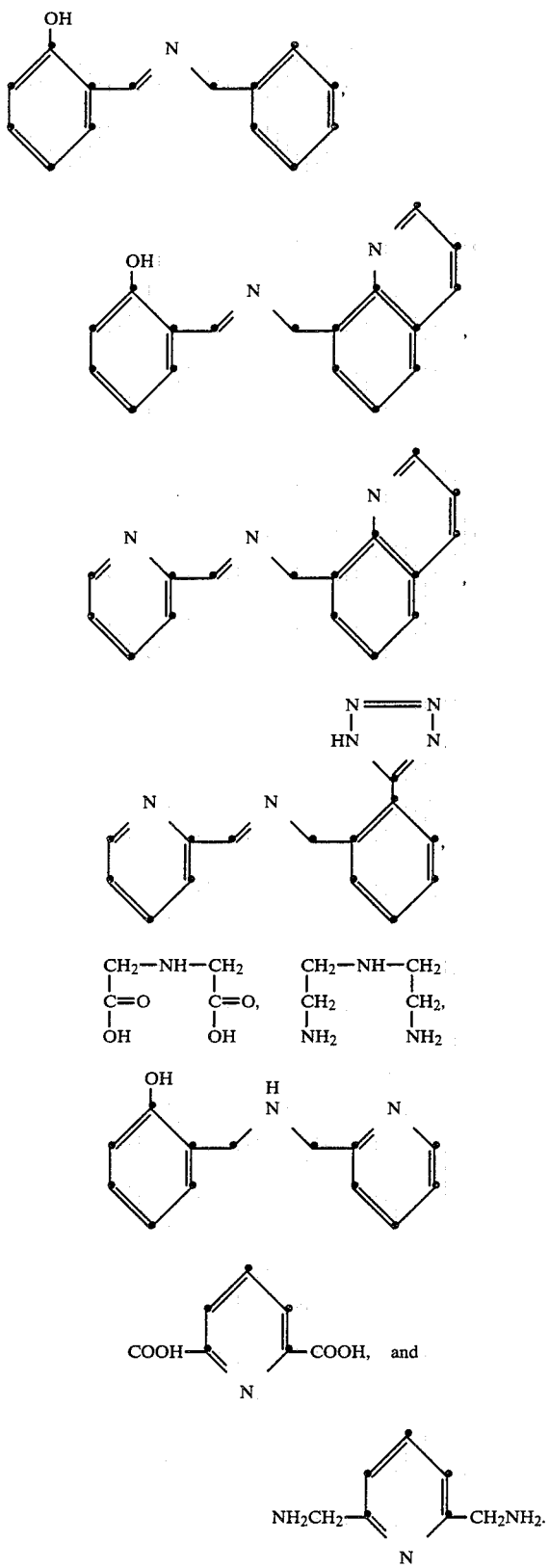

It will be appreciated that, after processing the photographic element described above containing the nondiffusible dye-releasing compounds of the invention, there remains in it after transfer has taken place an imagewise distribution of dye in addition to developed silver. A color image comprising residual nondiffusible compound is obtained in this element if the residual silver and silver halide are removed by any conventional manner well known to those skilled in the photographic art, such as a bleach bath, followed by a fix bath, a bleach-fix bath, etc. The imagewise distribution of dye may also diffuse out of the element into these baths, if desired, rather than to an image-receiving element. If a negative-working silver halide emulsion is employed in certain preferred photosensitive elements, described above, then a positive color image, such as a reflection print, a color transparency or motion picture film, is produced in this manner. If a direct-positive silver halide emulsion is employed in such photosensitive elements, then a negative color image is produced.

The photographic element described above may be treated in any manner with an alkaline processing composition to effect or initiate development. A preferred method for applying processing composition is by use of a rupturable container or pod which contains the composition. In general, the processing composition employed in this invention contains the developing agent for development, although the composition could also just be an alkaline solution where the developer is incorporated in the photographic element, image-receiving element or process sheet, in which case the alkaline solution serves to activate the incorporated developer.

A photographic film unit or assemblage in accordance with this invention comprises:
  (1) a photographic element as described above,
  (2) a dye image-receiving layer, and
  (3) an alkaline processing composition and means containing same for discharge within the assemblage,
the assemblage containing a silver halide developing agent.

The alkaline processing composition can be contained, for example, in a rupturable container which is adapted to be positioned during processing of the film unit so that a compressive force applied to the container by pressure-applying members, such as would be found in a camera designed for in-camera processing, will effect a discharge of the container's contents within the film unit.

The dye image-receiving layer in the above-described film assemblage is optionally located on a separate support adapted to be superposed on the photographic element after exposure thereof. Such image-receiving elements are generally disclosed, for example, in U.S. Pat. No. 3,362,819. When the means for discharging the processing composition is a rupturable container, it is usually positioned in relation to the photographic element and the image-receiving element so that a compressive force applied to the container by pressure-applying members, such as would be found in a typical camera used for in-camera processing, will effect a discharge of the container's contents between the image-receiving element and the outermost layer of the photographic element. After processing, the dye image-receiving element is separated from the photographic element.

The dye image-receiving layer in the above-described film assemblage in another embodiment is located integrally with the photographic element between the support and the lowermost photosensitive silver halide emulsion layer. One useful format for integral receiver-negative photographic elements is disclosed in Belgian Pat. No. 757,960. In such an embodiment, the support for the photographic element is transparent and is coated with an image-receiving layer, a substantially opaque light-reflective layer, e.g., $TiO_2$, and then the photosensitive layer or layers described above. After exposure of the photographic element, a rupturable container containing an alkaline processing composition and an opaque process sheet are brought into superposed position. Pressure-applying members in the camera rupture the container and spread processing composition over the photographic element as the film unit is withdrawn from the camera. The processing composition develops each exposed silver halide emulsion layer and dye images are formed as a function of development which diffuse to the image-receiving layer to provide a positive, right-reading image which is viewed through the transparent support on the opaque reflecting layer background. For other details concerning the format of this particular integral film unit, reference is made to the above-mentioned Belgian Pat. No. 757,960.

Another format for integral negative-receiver photographic elements in which the present invention is useful is disclosed in Canadian Pat. No. 928,559. In this embodiment, the support for the photographic element is transparent and is coated with the image-receiving layer, a substantially opaque, light-reflective layer and the photosensitive layer or layers described above. A rupturable container containing an alkaline processing composition and an opacifier is positioned adjacent the top layer and a transparent top sheet which has thereon a neutralizing layer and a timing layer. The film unit is placed in a camera, exposed through the transparent top sheet and then passed through a pair of pressure-applying members in the camera as it is being removed therefrom. The pressure-applying members rupture the container and spread processing composition and opacifier over the negative portion of the film unit to render it light-insensitive. The processing composition develops each silver halide layer and dye images are formed as a result of development which diffuse to the image-receiving layer to provide a positive, right-reading image which is viewed through the transparent support on the opaque reflecting layer background. For further details concerning the format of this particular integral film unit, reference is made to the above-mentioned Canadian Pat. No. 928,559.

Still other useful integral formats in which this invention can be employed are described in U.S. Pat. Nos. 3,415,644; 3,415,645; 3,415,646; 3,647,437 and 3,635,707. In most of these formats, a photo-sensitive silver halide emulsion is coated on an opaque support and a dye image-receiving layer is located on a separate transparent support superposed over the layer outermost from the opaque support. In addition, this transparent support also preferably contains a neutralizing layer and a timing layer underneath the dye image-receiving layer.

Another embodiment of the invention uses the image-reversing technique disclosed in British Pat. No. 904,364, page 19, lines 1 through 41. In this process, the dye-releasing compounds are used in combination with physical development nuclei in a nuclei layer contiguous to the photosensitive silver halide emulsion layer. The film unit contains a silver halide solvent, preferably in a rupturable container with the alkaline processing composition.

The film unit or assembly used in the present invention is used to produce positive images in single- or multicolors. In a three-color system, each silver halide emulsion layer of the film assembly will have associated therewith a dye-releasing compound which releases a dye possessing a predominant spectral absorption within the region of the visible spectrum to which said silver halide emulsion is sensitive (initially or after forming the coordination complex), i.e., the blue-sensitive silver halide emulsion layer will have a yellow or yellow-forming dye-releaser associated therewith, the green-sensitive silver halide emulsion layer will have a magenta or magenta-forming dye-releaser associated therewith, and the red-sensitive silver halide emulsion layer will have a cyan or cyan-forming dye-releaser associated therewith. The dye-releaser associated with each silver halide emulsion layer is contained either in the silver halide emulsion layer itself or in a layer contiguous to the silver halide emulsion layer.

The concentration of the dye-releasing compounds that are employed in the present invention may be varied over a wide range, depending upon the particular compound employed and the results which are desired. For example, the dye-releasers of the present invention may be coated in layers by using coating solutions containing between about 0.5 and about 8 percent by weight of the dye-releaser distributed in a hydrophilic film-forming natural material or synthetic polymer, such as gelatin, polyvinyl alcohol, etc, which is adapted to be permeated by aqueous alkaline processing composition.

Depending upon which CAR is used in the present invention, a variety of silver halide developing agents or electron transfer agents (ETA's) are useful in this invention. In certain embodiments of the invention, any ETA can be employed as long as it cross-oxidizes with the dye-releasers described herein. The ETA may also be incorporated in the photosensitive element to be activated by the alkaline processing composition. Specific examples of ETA's useful in this invention include hydroquinone compounds, aminophenol compounds, catechol compounds, and phenylenediamine compounds. In highly preferred embodiments, the ETA is a 3-pyrazolidinone compound. A combination of different ETA's, such as those disclosed in U.S. Pat. No. 3,039,869, can also be employed. These ETA's are employed in the liquid processing composition or contained, at least in part, in any layer or layers of the photographic element or film unit to be activated by the alkaline processing composition, such as in the silver halide emulsion layers, the dye image-providing material layers, interlayers, image-receiving layer, etc.

In a preferred embodiment of the invention, the silver halide developer or ETA employed in the process becomes oxidized upon development and reduces silver halide to silver metal. The oxidized developer then cross-oxidizes the dye-releasing compound. The product of cross-oxidation then undergoes alkaline hydrolysis, thus releasing an imagewise distribution of diffusible dye which then diffuses to the receiving layer to provide the dye image. The diffusible moiety is transferable in alkaline processing composition either by virtue of its self-diffusivity or by its having attached to it one or more solubilizing groups, for example, a carboxy, sulpho, sulphonamido, hydroxy or morpholino group.

In using the dye-releasing compounds according to the invention which produce diffusible dye images as a function of development, either conventional negative-working or direct-positive silver halide emulsions are employed. If the silver halide emulsion employed is a direct-positive silver halide emulsion, such as an internal-image emulsion designed for use in the internal image reversal process or a fogged, direct-positive emulsion such as a solarizing emulsion, which is developable in unexposed areas, a positive image can be obtained in certain embodiments on the dye image-receiving layer. After exposure of the film unit, the alkaline processing composition permeates the various layers to initiate development of the exposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then crossoxidizes the dye-releasing compounds and the oxidized form of the compounds then undergoes a base-catalyzed reaction to release the dyes imagewise as a function of the imagewise exposure of each of the silver halide emulsion layers. At least a portion of the imagewise distributions of diffusible dyes diffuse to the image-receiving layer to form a positive image of the original subject. After being contacted by the alkaline processing composition, a neutralizing layer in the film unit or image-receiving unit lowers the pH of the film unit or image receiver to stabilize the image.

Internal-image silver halide emulsions useful in this invention are described more fully in the November 1976 edition of *Research Disclosure*, pages 76 through 79, the disclosure of which is hereby incorporated by reference.

The various silver halide emulsion layers of a color film assembly employed in this invention are disposed in the usual order, i.e., the blue-sensitive silver halide emulsion layer first with respect to the exposure side, followed by the green-sensitive red-sensitive silver halide emulsion layers. If desired, a yellow dye layer or a yellow colloidal silver layer can be present between the blue-sensitive and green-sensitive silver halide emulsion layers for absorbing or filtering blue radiation that is transmitted through the blue-sensitive layer. If desired, the selectively sensitized silver halide emulsion layers can be disposed in a different order, e.g., the blue-sensitive layer first with respect to the exposure side, followed by the red-sensitive and green-sensitive layers.

The rupturable container employed in certain embodiments of this invention is disclosed in U.S. Pat. Nos. 2,543,181; 2,643,886; 3,653,732; 2,723,051; 3,056,492; 3,056,491 and 3,152,515. In general, such containers comprise a rectangular sheet of fluid- and air-impervious material folded longitudinally upon itself to form two walls which are sealed to one another along their longitudinal and end margins to form a cavity in which processing solution is contained.

Generally speaking, except where noted otherwise, the silver halide emulsion layers employed in the invention comprise photosensitive silver halide dispersed in gelatin and are about 0.6 to 6 microns in thickness; the dye-releasers are dispersed in an aqueous alkaline solution-permeable polymeric binder, such as gelatin, as a separate layer about 0.2 to 7 microns in thickness; and the alkaline solution-permeable polymeric interlayers, e.g. gelatin, are about 0.2 to 5 microns in thickness. Of course, these thicknesses are approximate only and can be modified according to the product desired.

Scavengers for oxidized developing agent can be employed in various interlayers of the photographic elements of the invention. Suitable materials are disclosed on page 83 of the November 1976 edition of *Research Disclosure*, the disclosure of which is hereby incorporated by reference.

Any material is useful as the image-receiving layer in this invention as long as the desired function of mordanting or otherwise fixing the dye images is obtained. The particular material chosen will, of course, depend upon the dye to be mordanted. Suitable materials are disclosed on pages 80 through 82 of the November 1976 edition of *Research Disclosure*, the disclosure of which is hereby incorporated by reference. Cationic mordants are preferred in order to bind the complex which usually has a negative charge.

Use of a neutralizing material in the film units employed in this invention will usually increase the stability of the transferred image. Generally, the neutralizing material will effect a reduction in the pH of the image layer from about 13 or 14 to at least 11 and preferably 5 to 8 within a short time after imbibition. Suitable materials and their functioning are disclosed on pages 22 and 23 of the July 1974 edition of *Research Disclosure*, and pages 35 through 37 of the July 1975 edition of *Research Disclosure*, the disclosures of which are hereby incorporated by reference.

A timing or inert spacer layer can be employed in the practice of this invention over the neutralizing layer which "times" or controls the pH reduction as a function of the rate at which alkali diffuses through the inert spacer layer. Examples of such timing layers and their functioning are disclosed in the *Research Disclosure* articles mentioned in the paragraph above concerning neutralizing layers.

The alkaline processing composition employed in this invention is the conventional aqueous solution of an alkaline material, e.g., alkali metal hydroxides or carbonates such as sodium hydroxide, sodium carbonate or an amine such as diethylamine, preferably possessing a pH in excess of 11, and preferably containing a developing agent as described previously. Suitable materials and addenda frequently added to such compositions are disclosed on pages 79 and 80 of the November 1976 edition of *Research Disclosure*, the disclosure of which is hereby incorporated by reference.

The alkaline solution-permeable, substantially opaque, light-reflective layer employed in certain embodiments of photographic film units used in this invention is described more fully in the November 1976 edition of *Research Disclosure*, page 82, the disclosure of which is hereby incorporated by reference.

The supports for the photographic elements used in this invention can be any material as long as it does not deleteriously affect the photographic properties of the film unit and is dimensionally stable. Typical flexible sheet materials are described on page 85 of the November 1976 edition of *Research Disclosure*, the disclosure of which is hereby incorporated by reference.

While the invention has been described with reference to layers of silver halide emulsions and dye image-providing materials, dotwise coating, such as would be obtained using a gravure printing technique, could also be employed. In this technique, small dots of blue-, green- and red-sensitive emulsions have associated therewith, respectively, dots of yellow, magenta and cyan color-providing substances. After development, the transferred dyes would tend to fuse together into a continuous tone. In an alternative embodiment, the emulsions sensitive to each of the three primary regions of the spectrum can be disposed as a single segmented layer, e.g., as by the use of microvessels, as described in Whitmore U.S. Pat. No. 4,362,806, issued Dec. 7, 1982.

The silver halide emulsions useful in this invention, both negative-working and direct-positive ones, are well known to those skilled in the art and are described in *Research Disclosure*, Volume 176, December 1978, Item No. 17643, pages 22 and 23, "Emulsion preparation and types"; they are usually chemically and spectrally sensitized as described on page 23, "Chemical sensitization", and "Spectral sensitization and desensitization", of the above article; they are optionally protected against the production of fog and stabilized against loss of sensitivity during keeping by employing the materials described on pages 24 and 25, "Antifoggants and stabilizers", of the above article; they usually contain hardeners and coating aids as described on page 26, "Hardeners", and pages 26 and 27, "Coating aids", of the above article; they and other layers in the photographic elements used in this invention usually contain plasticizers, vehicles and filter dyes described on page 27, "Plasticizers and lubricants"; page 26, "Vehicles and vehicle extenders"; and pages 25 and 26, "Absorbing and scattering materials", of the above article; they and other layers in the photographic elements used in this invention can contain addenda which are incorporated by using the procedures described on page 27, "Methods of addition", of the above article; and they are usually coated and dried by using the various techniques described on pages 27 and 28, "Coating and drying procedures", of the above article, the disclosures of which are hereby incorporated by reference.

The term "nondiffusing" used herein has the meaning commonly applied to the term in photography and denotes materials that, for all practical purposes, do not migrate or wander through organic colloid layers, such as gelatin, in the photographic elements of the invention in an alkaline medium and preferably when processed in a medium having a pH of 11 or greater. The same meaning is to be attached to the term "immobile". The term "diffusible" as applied to the materials of this invention has the converse meaning and denote materials having the property of diffusing effectively through the colloid layers of the photographic elements in an alkaline medium. "Mobile" has the same meaning as "diffusible".

The term "associated therewith" as used herein is intended to mean that the materials can be in either the same or different layers, so long as the materials are accessible to one another.

The following examples are provided to further illustrate the invention.

LIGAND SYNTHESIS EXAMPLE 1

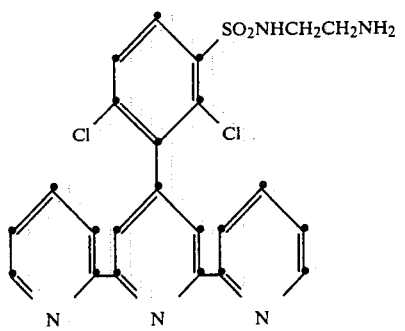

4'-[2,6-Dichloro-3-(2-amino ethylsulfamoyl)phenyl]2,2':6',2''-terpyridine

Potassium hydroxide (4.0 g) was added to a mixture of 2,6-dichlorobenzaldehyde (40.0 g), 2-acetylpyridine (28.0 g) and methanol (500 ml). The mixture was stirred at room temperature for 4 hours, cooled to 0° C. and filtered. The pale yellow precipitate was washed with cold methanol and air dried to yield 51.8 g (82 percent) of desired pure product, 1-(2-pyridyl)-3-(2,6-dichlorophenyl)propenone.

To a solution of methanol (300 ml) and acetic acid (120 ml) was added 1-(2-pyridyl)-3-(2,6-dichlorophenyl)propenone (18.0 g) and N-(2-pyridylcarbonylmethyl)pyridinium iodide (21.0 g). Ammonium acetate (120 g) was then added and the solution was refluxed under nitrogen for 20 hours. The flask was cooled in an ice bath for several hours and the resulting solid was filtered off, washed with cold methanol and air dried. Yield: 16.4 g (66 percent) of desired pure product, 4'-(2,6-dichlorophenyl)-2,2':6',2''-terpyridine.

The previously prepared 'terpyridine' (10.0 g) was added in small portions to chlorosulfonic acid (20 ml). This solution was warmed to 120° C. for 5 hours. The solution was cooled and then carefully and slowly poured onto a minimum volume (50 g) of ice. As the ice was consumed, the flask was recooled in a dry-ice-acetone bath until all the solution was added. The solid was filtered, washed with a minimum of ice water and air dried to give 12.1 g of product. Formation of the sulfonyl chloride was verified by its infrared spectrum.

The sulfonyl chloride prepared above (12.1 g) was slowly added to a mixture of ethylenediamine (30 ml) in tetrahydrofuran (100 ml) and refluxed for 2 hours. The mixture was cooled, about 50 ml of tetrahydrofuran was removed by vacuum. This solution was poured into 500 ml ice water to precipitate product. After filtration and washing with distilled water, the solid was suspended in refluxing ethanol for 20 minutes and cooled. The yield was 7.6 g (72 percent) (m.p. 298° C.)

LIGAND SYNTHESIS EXAMPLE 2

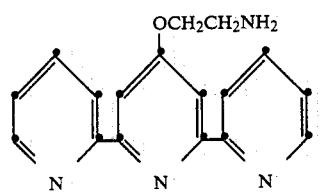

4'-(2-aminoethoxy)-2,2':6',2''-terpyridine

4'-Methylthio-2,2':6',2''-terpyridine (25. g) (prepared in two steps from 2-acetylpyridine as described by K. T. Potts, et al., J. Org. Chem., 47, 3027 (1982)) was suspended in methanol (500 ml) containing acetic acid (75 ml) and sodium acetate (40 g). Sunny Sol ® bleach (325 g, containing 5.3 percent available chlorine by weight as sodium hypochlorite) was added dropwise with stirring over 90 minutes, keeping the temperature below 20° C. by cooling. The mixture was then diluted with water to 2 l and filtered. The crude product was slurried with ethanol (250 ml) to dissolve impurities and filtered. The yield of the methylsulfonyl derivative was 18.2 g.

A mixture of tetrahydrofuran distilled from lithium aluminum hydride (300 ml), ethanolamine vacuum distilled into 4 A molecular sieves (8.9 g) and potassium t-butoxide (13.5 g) was stirred at room temperature for 20 minutes. Solid 4'-methylsulfonyl-2,2':6',2''-terpyridine (25.0 g) was then added and the solution allowed to stir at room temperature for 4 hours. The solution was filtered to remove potassium methanesulfinic acid and concentrated to dryness. The solid obtained was redissolved in acetonitrile (150 ml), filtered while hot, and then cooled to give 18.4 g of product. (m.p. 134°–137° C.)

LIGAND-METAL SYNTHESIS EXAMPLE 3

Terpyridine nickel diacetate

Terpyridine (10.0 g) was dissolved in 200 ml tetrahydrofuran and slowly added to a solution of nickel acetate hexahydrate (10.0 g) in 50 ml water, 50 ml methanol and 25 ml acetic acid. The solution was allowed to stir for one hour at room temperature and was then evaporated to dryness. Acetonitrile (100 ml) was added and evaporated to dry the solid. Trituration with acetonitrile and filtration gave 67 percent of the desired 1:1 product. The filtrate contains mostly 2:1 complex which upon standing converts to the 1:1 product.

CYAN TERNARY COMPLEX SYNTHESIS EXAMPLE 4

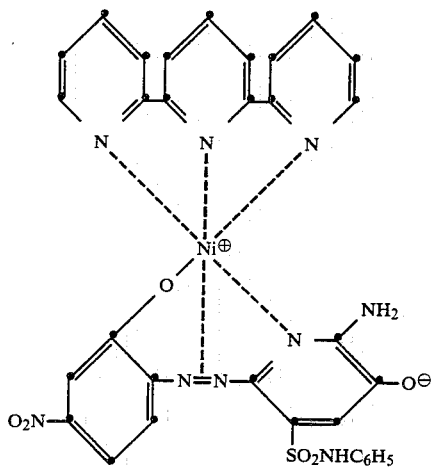

The azo dye, 2-amino-6-(2'-hydroxy-4'-nitrophenylazo)-5-phenyl-sulfamoyl-3-pyridinol (1.0 g) was dissolved in 500 ml of ethanol and 0.63 g of nickel acetate.4H$_2$O in 200 ml of ethanol was added at 50° C. After 20 minutes of stirring, terpyridine (0.34 g) in 10 ml of ethanol was added. The solution was stirred for 20 minutes and cooled, precipitating out 0.56 g of the pure ternary complex.

This ternary complex was also prepared by an alternative route by treating terpyridine nickel diacetate with one equivalent of the above dye.

MAGENTA TERNARY COMPLEX SYNTHESIS EXAMPLE 5

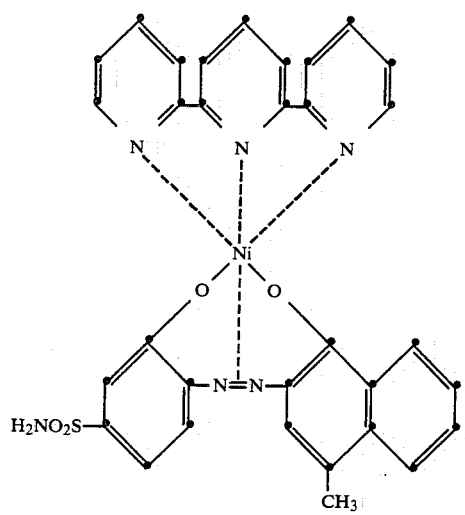

The azo dye 2-(2-hydroxy-5-sulfamoylphenylazo)-4-methyl-1-naphthol (1.43 g) was dissolved in 100 ml of ethanol containing enough ammonium hydroxide to obtain a homogeneous solution. Nickel acetate tetrahydrate (1.15 g) in 10 ml of water was then added. Immediate precipitation of the desired 1:1 complex occurred. This was filtered, washed with water, and air dried. This material was recrystallized from a mixture of tetrahydrofuran and water to give 1.3 g of pure product. This 1:1 complex (0.79 g) was dissolved in 35 ml of pyridine; to which terpyridine (0.37 g) in 50 ml of pyridine was added. The mixture was stirred for 30 minutes, evaporated to dryness and chromatographed on silica gel, eluting first with ethyl acetate and then with ethyl acetate:pyridine 4:1 to give 0.42 g of pure product.

This ternary complex was also prepared by rapidly stirring a solution of terpyridine nickel diacetate (0.5 g) in methanol, and slowly adding a hot ethanol solution of the above dye (0.39 g). The solution was cooled and the precipitate was filtered to give 0.51 g. The product was identical to the sample prepared in the above procedure.

Thiophene Cyan Redox Dye Releaser
TERNARY COMPLEX SYNTHESIS EXAMPLE 6

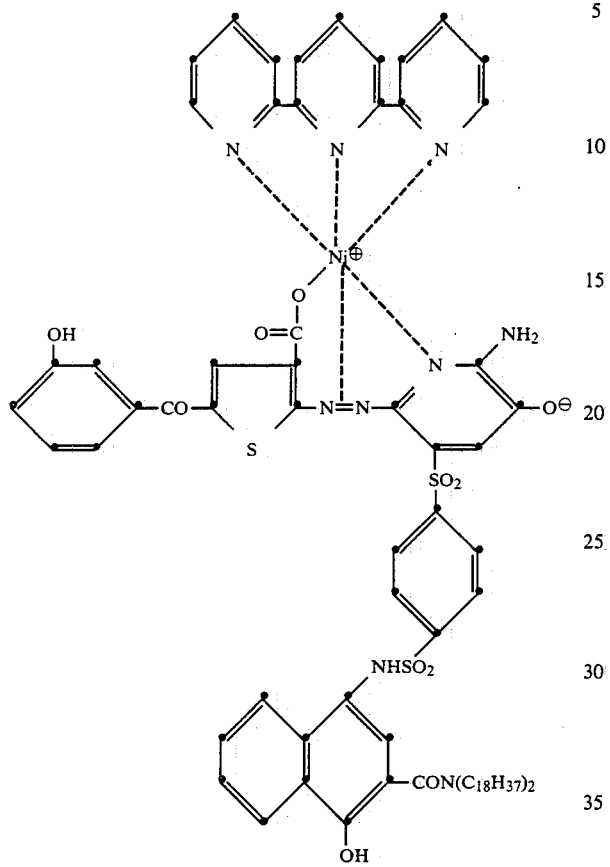

The metallizable 6-(2-thienylazo)-3-pyridinol redox dye releaser of the above structure was prepared by the method described in U.S. Pat. No. 4,396,546 of Krutak, et al.

The above redox dye releaser (5.2 g, 4 meq.) was added at 25° C. under argon to a solution of nickel acetate tetrahydrate (10.0 g, 40 meq.) in ethyl Cellosolve (150 ml) degassed with argon. The reaction was stirred at 50° C. for two hours, poured into 750 ml distilled water and filtered. The solid was washed with water and air dried. The yield was 3.6 g of the nickel complex.

A solution of terpyridine (0.42 g, 1.8 mmoles) in ethyl Cellosolve (5 ml) was added at 25° C. under argon with stirring to a solution of the nickel complex prepared above (2.5 g, 1.8 mmoles) in ethyl Cellosolve (75 ml) degassed with argon. The reaction was indicated to be complete in 15 minutes by thin-layer chromatography. After 2 hours the reaction was poured into ice-water, filtered, water-washed, and air dried to give 2.5 g of product. Percent Ni (calculated): 3.74; (found): 3.95.

PHOTOGRAPHIC EXAMPLE 1
Hue Test

A methanolic solution of the ternary complex of Synthesis Example 4 was imbibed onto a mordant receiver of poly(4-vinylpyridine) (2.2 g/m$^2$) in gelatin (2.2 g/m$^2$) coated on a clear polyester support. The transmission spectrum was obtained ($\lambda$-max 690 nm, HBW: 115 nm). This compares to the spectrum of the same free dye complexed on a similar receiver containing nickel sulfate (0.58 g/m$^2$) as a metallizing agent ($\lambda$-max: 680 nm, HBW: 135 nm). This shows the ternary complex absorbs at a slightly longer wavelength and has a narrower dye absorption envelope than the comparison. (HBW is the half-band width, the width of the dye absorption envelope at one-half the normalized D=1.0 dye density).

The absorption spectrum was also obtained for a similar ternary complex as that of Synthesis Example 4 but having a p-toluenesulfonyl group instead of a phenylsulfamoyl group on the pyridinol ring. For the ternary complex ($\lambda$-max: 660 nm, HBW=94 nm) as compared to the nickel sulfate complex ($\lambda$-max: 645 nm, HBW=101 nm). Again, the ternary complex had a narrower HBW than the comparison.

PHOTOGRAPHIC EXAMPLE 2
Light Stability Test

The following three metallizable azo dyes were imbibed from alkaline solution onto a receiver sheet of poly(styrene-co-N-benzyl-N,N-dimethyl-N-vinylbenzylammonium chloride-co-divinylbenzene) (2.3 g/m$^2$) and gelatin (2.3 g/m$^2$) coated on clear polyester support:

Yellow Metallizable Dye

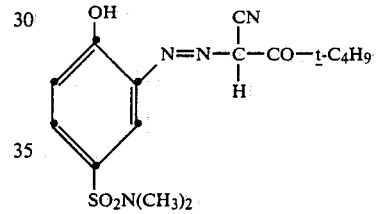

Magenta Metallizable Dye

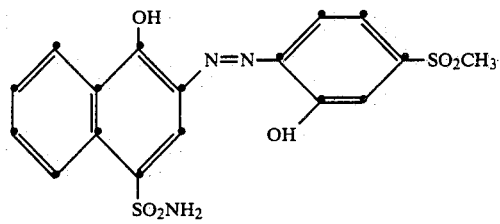

Cyan Metallizable Dye

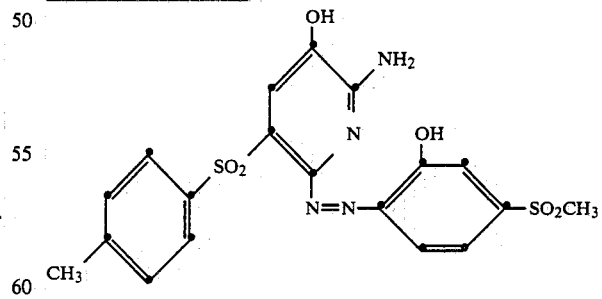

A separate receiver sheet of each imbibed dye was placed in each of the following two solutions for 5 minutes:

(a) Nickel acetate tetrahydrate (2 g/l) in pH 7 phosphate buffer (control) and
(b) Terpyridine nickel diacetate (Synthesis Example 3) (2 g/l) in pH 7 phosphate buffer.

After imbibition, the strips were briefly washed with distilled water, dried and faded for 3 weeks, 50 kLux, 5400° K. 35° C., 53 percent RH with the sample surface covered with a Wratten 2B filter. Comparison of the Status A density before and after fade indicated the percent dye loss as follows:

| Metallizable Dye | Percent Dye Loss | |
|---|---|---|
| | Ni(II) Acetate Imbibition | Ni(II) Terpyridine Imbibition |
| Yellow | −14 | −3 |
| Magenta | −12 | −5 |
| Cyan | −22 | −17 |

The results indicate the improved light stability obtained when terpyridine nickel diacetate was used as a metallizing agent for the dyes.

PHOTOGRAPHIC EXAMPLE 3

Diffusibility Test (A) A photosensitive donor element of the peel-apart type was prepared by coating the following layers in the order recited on an opaque poly(ethylene terephthalate) film support. Coverages are parenthetically given in g/m² unless otherwise indicated.

(1) Polymeric acid layer of poly(n-butyl acrylate-co-acrylic acid) at a 30:70 weight ratio equivalent to 81 meq. acid/m²;

(2) Timing layer of a 1:9 physical mixture of poly(acrylonitrile-co-vinylidene chloride-co-acrylic acid) (weight ratio 14:79:7) and the carboxyester-lactone formed by cyclization of a vinyl acetate-maleic anhydride copolymer in the presence of 1-butanol to produce a partial butyl ester (ratio of acid:ester of 15:85) (4.8);

(3) Cyan RDR Compound 7 (16 mmoles/m²), ETA (0.54) and gelatin (2.8);

(4) Imaging layer of red-sensitized, negative, 0.65 μm silver chloride cubic emulsion (5 g/Ag mole), octadecylquinone (0.39) and gelatin (0.86);

(5) Overcoat layer of didodecylhydroquinone (0.3), bis(vinylsulfonyl)methyl ether (1.5% of the total gelatin weight) and gelatin (0.54).

(B) An element similar to A was prepared but using Compound 8 in layer 3.

(C) An element similar to A was prepared but using Compound 9 in layer 3.

(D) An element similar to A was prepared but using Compound 10 in layer 3.

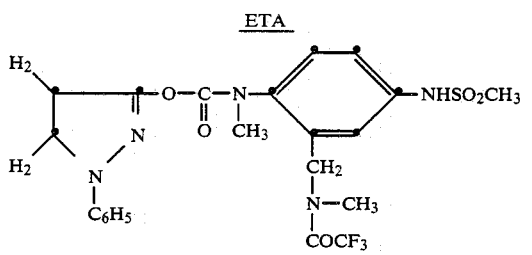

ETA

An activator solution was prepared consisting of:

| Potassium hydroxide | 33.7 g/l |
|---|---|
| 5-Methylbenzotriazole | 3.0 g/l |
| Potassium bromide | 2.0 g/l |
| 11-Aminoundecanoic acid | 2.0 g/l |

A receiving element was prepared by coating the following layers on a polyethylene-coated paper support:

1. Mordant layer of poly(styrene-co-1-vinylimidazole-co-3-benzyl-1-vinylimidazolium chloride) (2.3 g/m²) and gelatin (2.3 g/m²), and
2. Overcoat layer of gelatin (0.54 g/m²).

The donor element was uniformly flashed to full-exposure on a sensitometer, soaked for 15 seconds at room temperature in the activator solution and laminated to the receiver. The laminated unit was cut into four quarters, and placed on a flat constant-temperature (24° C.) plate. Each segment was peeled at 1, 3, 5, and 10 minutes, dried, and the Status A red density was read. The shortest time to obtain constant (maximum) density was recorded as an estimate of the relative access time. The following results were obtained:

| Donor Element | RDR Compound | Approximate Minimum Time to Constant Density (min.) | |
|---|---|---|---|
| A | 7 | 5 | (D = 0.76) |
| B | 8 | 3 | (D = 1.0) |
| C | 9 | 10 | (D = 0.80) |
| D | 10 | 5 | (D = 0.85) |

The data indicate that the RDR compounds of the invention are effective imagers in an image transfer element by obtaining maximum density in a reasonable access time.

In a separate test, with the exception of Compound 8, there was essentially no loss in sharpness (measured by a line resolution chart) in an incubation test at 32° C., 90% RH for four days.

The invention has been described in detail with particular reference to preferred embodiments thereof, but it will be understood that variations and modifications can be effected within the spirit and scope of the invention.

What is claimed is:

1. A nondiffusible compound capable of releasing at least one diffusible dye moiety having the formula:

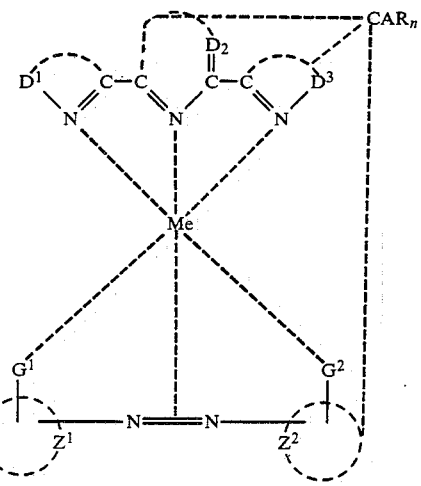

wherein:

(a) $D^1$, $D^2$ and $D^3$ each independently represents the atoms necessary to complete an aromatic heterocyclic nucleus having at least one ring of 5 to 7 atoms;

(b) $Z^1$ and $Z^2$ each independently represents the atoms necessary to complete an aromatic carbocyclic or heterocyclic nucleus having at least one ring of 5 to 7 atoms or a ketomethine group;

(c) $G^1$ and $G^2$ each independently represents a metal chelating group;

(d) Me is a polyvalent, hexacoordinate metal ion, (e) CAR represents a ballasted carrier moiety capable of releasing said diffusible dye moiety as a function of development of said silver halide emulsion layer under alkaline conditions; and (f) n is 1, 2 or 3.

2. The compound of claim 1 wherein $Z^1$ and $Z^2$ each independently represents the atoms necessary to complete a substituted or unsubstituted pyridine ring, benzene ring, naphthalene ring or a ketomethine group.

3. The compound of claim 2 wherein $G^1$ and $G^2$ independently represents OH, COOH or a nitrogen atom which is part of $Z^1$ or $Z^2$.

4. The compound of claim 1 wherein $D^1$, $D^2$ and $D^3$ each independently represents the atoms necessary to complete a pyridine or substituted pyridine ring.

5. The compound of claim 4 wherein Me is nickel(II), copper(II), zinc(II), platinum(II), palladium(II), cobalt(II) or cobalt(III).

6. The compound of claim 4 wherein Me is nickel(II), n is 1, CAR is attached to the pyridine ring of $D^2$, and $Z^1$ and $Z^2$ each independently represents the atoms necessary to complete a substituted or unsubstituted pyridine ring, phenol ring, naphthol ring or a ketomethine group.

7. The compound of claim 1 wherein CAR is a group having the formula:

(Ballast—Carrier—Link)— wherein:
(a) Ballast is an organic ballasting radical of such molecular size and configuration as to render said compound nondiffusible in a photographic element during development in an alkaline processing composition;

(b) Carrier is an oxidizable acyclic, carbocyclic or heterocyclic moiety; and (c) Link represents a group which, upon oxidation of said carrier moiety, is capable of being hydrolytically cleaved to release said diffusible dye.

8. The compound of claim 7 wherein the Carrier moiety contains atoms according to the following configuration:

$a(-C=C)_b-$ wherein:
b is a positive integer of 1 to 2; and
a represents the radicals OH, SH, NH or hydrolyzable precursors thereof.

9. The compound of claim 1 wherein CAR is a group having the formula:

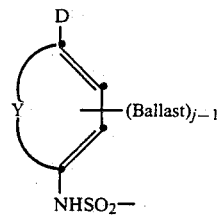

wherein:
(a) Ballast is an organic ballasting radical of such molecular size and configuration as to render said compound nondiffusible in a photographic element during development in an alkaline processing composition;

(b) D is $OR^1$ or $NHR^2$ wherein $R^1$ is hydrogen or a hydrolyzable moiety and $R^2$ is hydrogen or a substituted or unsubstituted alkyl group of 1 to 22 carbon atoms;

(c) Y represents the atoms necessary to complete a benzene nucleus, a naphthalene nucleus, or a 5- to 7-membered heterocyclic ring; and (d) j is a positive integer of 1 to 2 and is 2 when D is $OR^1$ or when $R^2$ is hydrogen or an alkyl group of less than 8 carbon atoms.

10. The compound of claim 9 wherein D is OH, j is 2 and Y is a naphthalene nucleus.

11. The compound of claim 1 wherein said dye-releasing compound is:

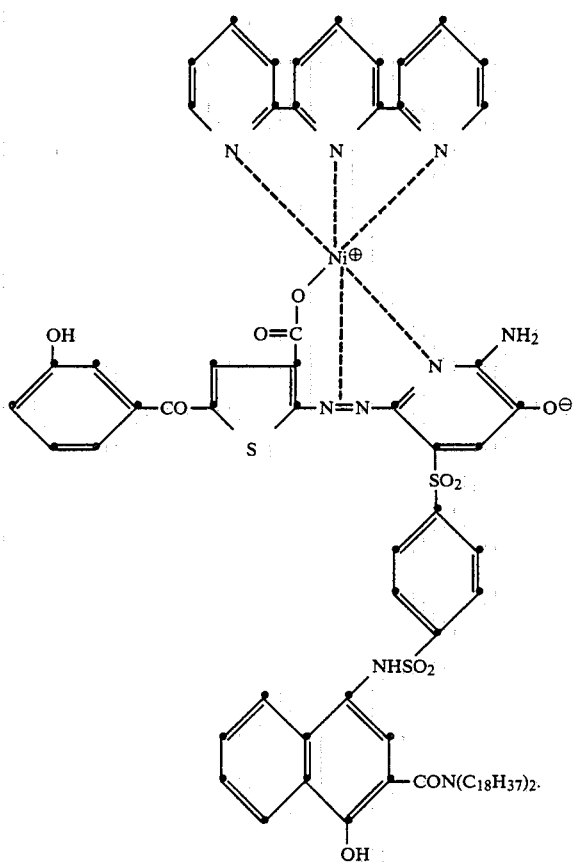

12. A photographic element comprising a support having thereon a photographic mordant having bound thereto a coordination complex having the formula:

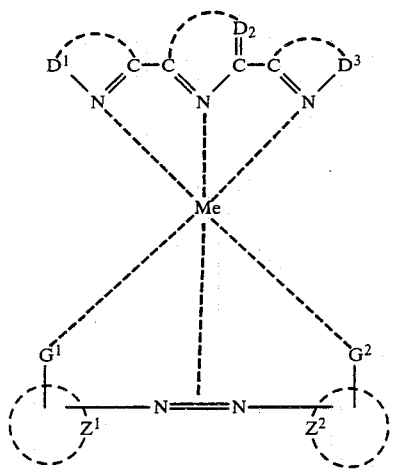

wherein:

(a) $D^1$, $D^2$ and $D^3$ each independently represents the atoms necessary to complete an aromatic heterocyclic nucleus having at least one ring of 5 to 7 atoms;

(b) $Z^1$ and $Z^2$ each independently represents the atoms necessary to complete an aromatic carbocyclic or heterocyclic nucleus having at least one ring of 5 to 7 atoms or a ketomethine group;

(c) $G^1$ and $G^2$ each independently represents a metal chelating group; and (d) Me is a polyvalent, hexacoordinate metal ion.

13. The photographic element of claim 12 wherein $Z^1$ and $Z^2$ each independently represents the atoms necessary to complete a substituted or unsubstituted pyridine ring, benzene ring, naphthalene ring or a ketomethine group.

14. The photographic element of claim 13 wherein $G^1$ and $G^2$ independently represents OH, COOH or a nitrogen atom which is part of $Z^1$ or $Z^2$.

15. The photographic element of claim 12 wherein $D^1$, $D^2$ and $D^3$ each independently represents the atoms necessary to complete a pyridine or substituted pyridine ring.

16. The photographic element of claim 15 wherein Me is nickel(II), copper(II), zinc(II), platinum(II), palladium(II), cobalt(II) or cobalt(III).

17. The photographic element of claim 15 wherein Me is nickel(II) and $Z^1$ and $Z^2$ each independently represents the atoms necessary to complete a substituted or unsubstituted pyridine ring, phenol ring, naphthol ring or a ketomethine group.

* * * * *